Sept. 20, 1971    F. D. ULTIMO    3,606,301
CLAMPING DEVICE
Filed June 25, 1969

*INVENTOR.*
FRANK D. ULTIMO

BY Joseph F. Padlon

ATTORNEY

United States Patent Office 3,606,301
Patented Sept. 20, 1971

3,606,301
CLAMPING DEVICE
Frank D. Ultimo, 406 9th St.,
Brooklyn, N.Y. 11215
Filed June 25, 1969, Ser. No. 836,443
Int. Cl. B25b 5/10
U.S. Cl. 269—243         5 Claims

ABSTRACT OF THE DISCLOSURE

A simple and rugged clamping device useful for various purposes in many trades but particularly adaptable in carpentry for holding together two angularly disposed timbers while they are being nailed, one to the other.

The present invention, while relating to clamping devices in general, has more particular reference to an implement adaptable for use in various trades in holding two work pieces together in properly aligned relation, and against relative shifting, while the joint is made secure by appropriate fastening devices.

When, for example, in nailing a stud to a joist, a carpenter with one hand holds the stud against shifting while, with a hammer in his other hand a nail is toed angularly through the stud and into the joist. This is often difficult and unsatisfactory, according to conditions under which the work is being done, and a main objective of the invention is the provision of a clamp particularly adaptable to carpentry in that it is quickly applied and removed and eliminates the necessity of steadying the work in instances and in the manner just above described.

Another object of the invention is the provision of a clamping element of few parts sturdy in construction and inexpensive to manufacture.

A further object is to provide an implement for the purpose set forth which includes two clamping plates movable relatively toward and from each other and which are of a new and novel construction.

A still further object of the invention is to provide a clamping device by the use of which time will be saved and more efficient work accomplished.

The accompanying drawings illustrating a preferred embodiment of the invention and forming a part of the specification are as follows.

Figure 1:
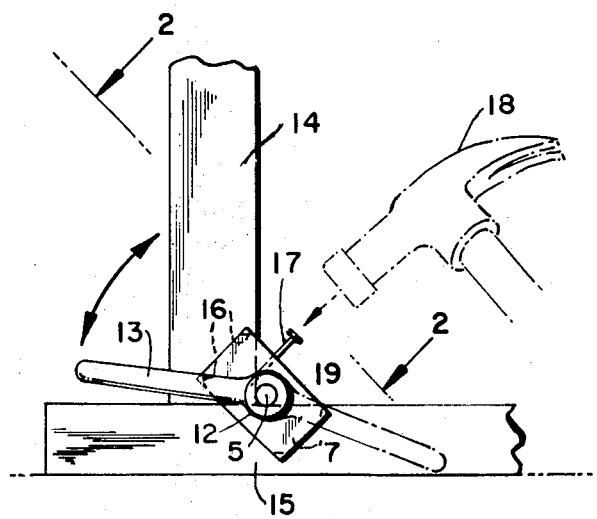
FIG. 1 is an end view of the clamp in an operative position of holding two work pieces together and at right angles to each other, while a nail is toed into one of the pieces, a hammer in the act of driving the nail being shown in phantom outline.

It is to be understood that the drawing is for the purpose of illustration only, and that such changes in design and structure of parts may be made as do not depart from the spirit of the invention as herein set forth, and scope of the appended claims.

In the drawing like reference numerals indicate similar parts throughout different views.

Figure 2:
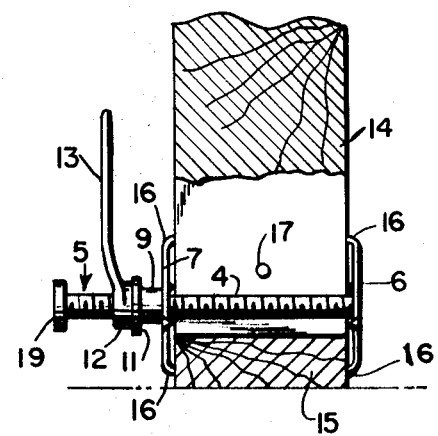
FIG. 2 is a side view of the clamp of FIG. 1, with the two work pieces shown in section along the line 2—2 of FIG. 1 looking in the direction of the arrows.
Figure 3:
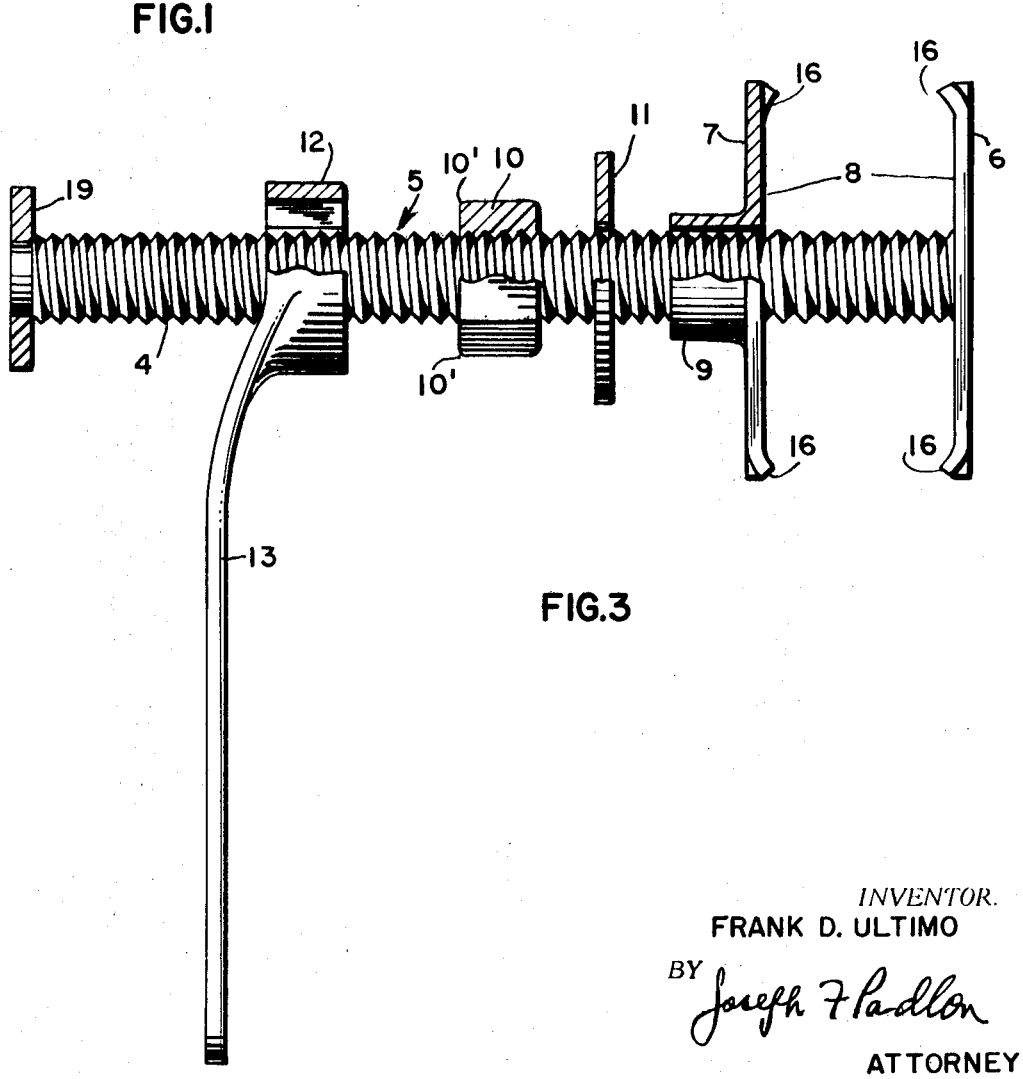
FIG. 3 is an enlarged longitudinal view of the clamp with the axially movable elements thereof spread apart, this view being shown partly in elevation and partly in central longitudinal section.

As seen in FIG. 3, an elongated shank 5 includes a threaded portion 4 on which are two opposing clamping plates 6 and 7 preferably of rectangular configuration and having non-slipping work engaging surfaces 8, one of these clamping plates being fixed and the other free floating and axially slidable on the elongated threaded shank 5. The fixed plate 6 is centered on one end, the right with respect to FIGS. 2 and 3, of the shank 5, and by welding or otherwise made integral therewith. The plate 6 in effect constitutes a head for the shank.

The axially slidable plate 7, in order to provide a longer bearing surface, is formed with a hub portion 9. And, interposed between the hub 9 and a nut 10 threaded on the shank 5 is a free floating washer 11. Also axially slidable along the shank 5 is the head member 12 of a box wrench 13 manually operable in turning the nut 10 in tightening and loosening the clamping plate. By providing sufficient looseness in the engaging threads of nut and shank, and by rounding or slightly chamfering the corners 10′ of the nut 10, see FIG. 3, manipulation of the wrench in its movement into and out of engagement with the clamping nut 10 becomes a quick and easy operation.

In FIGS. 1 and 2, the work piece 14 is representative of a stud being nailed to a joist 15, the two timbers being shown as held together by the clamping plate of this invention. The clamping plates 6 and 7 are, as stated, preferably of rectangular shape and, as shown, the corners of these plates are bent forwardly and thus provide teeth 16 which, when the nut 10 is tightened by an angular throw of the wrench, will dig into the work pieces 14 and 15 in a manner to prevent their slipping while a nail 17 is being driven home by hammer 18. A suitable stop 19 integral with the free end of shank 5 prevents removal of the wrench 13 from the elongated threaded shank.

What I now claim is:

1. A clamping device comprising in combination, an elongated threaded shank, a stationary clamping plate providing a fixed head on said shank, a movable clamping plate in opposed relation to said stationary clamping plate but freely rotatable and axially slidable on said threaded shank, a nut threaded onto said shank, a free floating washer interposed between said movable clamping plate and said nut, non slipping means on the oposed faces of said clamping plates, a box wrench slidable along said shank for axial movement into and out of engagement with said nut and a stop on said shank which limits movement of said wrench in a direction away from said nut and prevents removal of said wrench from the shank.

2. The combination according to claim 1 wherein said movable clamping plate includes a hub portion which adds bearing surface to such plate and provides open spacing between the plate and said washer when said nut has been moved into clamping engagement against the washer, and, wherein corners on said nut are rounded to permit free and easy movement of the wrench onto the said nut.

3. The combination according to claim 1 wherein the said clamping plates are of rectangular configuration and centered on said shank.

4. The combination according to claim 1 wherein said clamping plates include protruding teeth on the respective corners thereof, said protruding teeth being bent toward each other to prevent relative rotation of the clamping plates when said nut is tightened.

5. The combination according to claim 1 wherein said movable clamping plate includes a bore having a diameter slightly greater than the diameter of said threaded shank.

References Cited

UNITED STATES PATENTS

| | | | |
|---|---|---|---|
| 521,265 | 6/1894 | Haberthur | 269—243X |
| 1,365,344 | 1/1921 | Rosenberg | 269—243X |
| 2,345,419 | 3/1944 | Olson | 269—243X |
| 2,911,022 | 11/1959 | Brown | 269—321SX |
| 3,083,007 | 3/1963 | Campfield | 269—321S |

WILLIAM S. LAWSON, Primary Examiner

U.S. Cl. X.R.

269—321S